United States Patent Office 2,958,595
Patented Nov. 1, 1960

2,958,595

COMPOSITIONS BASED ON 2,4-DICHLOROPHEN-OXYETHANOL FOR THE WEED CONTROL IN THE RICE FIELDS

Giovanni Pellegrini, Pietro Scrivani, and Araldo Bugiani, Florence, Italy, assignors to Montecatini Societa Generale per l'Industria Mineraria e Chimica, a corporation of Italy No Drawing. Filed Oct. 31, 1956, Ser. No. 619,393

Claims priority, application Italy Nov. 11, 1955

3 Claims. (Cl. 71—2.3)

This invention relates to compositions comprising 2,4-dichlorophenoxyethanol (2,4-ETN) appropriately provided in granular form together with diluents which may have fertilizing properties, for the purpose of controlling weeds (especially *Panicum crus-galli*) in rice fields prepared for sowing or transplantation.

The use of sodium 2,4-dichlorophenoxy-ethylsulfate (2,4-DES) has been previously suggested for weed control in rice fields (Italian Patent No. 529,529).

We have now found that, if 2,4-dichlorophenoxyethanol is used in doses equal to lower than those of the aforementioned compound, a more rapid and complete weed control is obtained, together with a better safeguard for the crop.

We found that a preferred use of 2,4-ETN over 2,4-DES for the aforementioned purpose is based on the following properties of 2,4-ETN:

(1) The product itself is active, while 2,4-DES, in order to become active, requires a chemico-biological conversion in the soil to 2,4-dichlorophenoxyethanol. This results in a rapid action of 2,4-ETN on the sprouting weeds and in an independency of the action from prevailing conditions, particularly from the temperature. This fact is of primary importance because the meteorologic conditions at the time of sowing or transplanting are subject to substantial variation from year to year.

(2) 2,4-ETN, used under the same conditions and at stoichiometric equivalents, has a more intensive effect than 2,4-DES and a longer lasting action which extends the activity of 2,4-ETN even against more mature weed sprouts. This fact, which we determined experimentally, is of utmost importance in the practical application of a weed killer used for this purpose, in view of the relatively short period of time that normally elapses between treatment and sowing, and the fact that the weed seeds germinate only gradually during this period.

As a result of the higher efficiency of 2,4-dichlorophenoxyethanol, the doses practically used which, in case of a composition containing 2,4-DES amount to 5–10 kg. of active substance/hectare for pre-sowing treatment, subsequent to transplantation treatment or surface treatment, can be conveniently lowered to 4–5 kg./hectare of active substance.

(3) 2,4-ETN has a lower aqueous solubility than 2,4-DES which results in a concentration of the active substance in the sub-surface layers of the soil containing the weed seeds that are ready to germinate, and, consequently, in a higher weedkilling activity and, lastly, in an easier removal of the residues of active substance by lavement of the rice field in the usual manner.

Except for the changes in the doses used, the mode of application of the product is the same as described in Italian Patent No. 529,529 which relates to the methods of using 2,4-DES.

In the following examples, the results of a number of experiments are described for the purpose of illustrating the present invention without intent, however, to thereby limit the scope of the disclosure.

EXAMPLE 1

A comparison between the weed control activity of 2,4-ETN and 2,4-DES on sprouts of *Panicum crus-galli* as a function of the stage of development of the sprouts and of the amounts used, was carried out in greenhouse tests. A number of pots containing sieved soil from a rice field, were sown each with 250 *Panicum crus-galli* seeds; immediately after sowing the soil was submerged under 6–7 cm. of water. The treatment with the two products (at identical conditions) was carried out on one-half of the pots when the seedlings were 1 cm. high and on the other half when the seedlings were 3 cm. high. The results obtained at the end of the test are set forth in Table 1.

*Table 1*

| Test | Product used | Dosage, kg./ha. act. subst. | Height of the seedlings, cm. | Length of epigeous part, cm. | Length of hypogeous part, cm. | Percent of damaged seedlings in comparison with germinated seeds | | |
|---|---|---|---|---|---|---|---|---|
| | | | | | | contorted | rotten | total |
| 1 | Control | | | 13.455±0.358 | 2.811±0.141 | 4.86 | | 4.86 |
| 2 | 2,4-DES | 2 | 1 | 5.075±0.358 | 0.854±0.141 | 80.43 | 19.57 | 100 |
| 3 | 2,4-ETN | 2 | 1 | 4.244±0.358 | 0.459±0.141 | 54.17 | 45.83 | 100 |
| 4 | 2,4-DES | 4 | 1 | 3.632±0.358 | 0.178±0.141 | 47.69 | 52.31 | 100 |
| 5 | 2,4-ETN | 4 | 1 | 2.851±0.358 | 0.080±0.141 | 25.00 | 75.00 | 100 |
| 6 | 2,4-DES | 2 | 3 | 9.458±0.358 | 1.327±0.141 | 29.13 | 3.88 | 33.01 |
| 7 | 2,4-ETN | 2 | 3 | 4.809±0.358 | 0.577±0.141 | 88.17 | 11.83 | 100 |
| 8 | 2,4-DES | 4 | 3 | 6.718±0.358 | 0.734±0.141 | 87.18 | 3.80 | 90.98 |
| 9 | 2,4-ETN | 4 | 3 | 3.840±0.358 | 0.285±0.141 | 51.19 | 48.81 | 100 |

From an examination of the foregoing biometric results it is evident that both products exerted a substantial weedkilling activity either by hindering the growth of the epigeous part and the roots, or by causing morphological anomalies and rotting of the seedlings.

In the case of treating the 1-cm. seedlings, the higher activity of 2,4-dichlorophenoxyethanol, in comparison with 2,4-DES, is particularly apparent in connection with the lower dose. In the case of treating the 3-cm. seedlings, the difference in the activity of the two products is still more apparent; in fact, in the pots treated with both doses of 2,4-DES a number of small plants survived which probably would have completed their growth cycle even if they did not reach the size of the control plants, whereas practically no weed survived when 2,4-dichlorophenoxyethanol was used.

Example 2

A test was made to compare the rate of diffusion of 2,4-DES and 2,4-dichlorophenoxyethanol in soil. For this purpose, to a series of cylindrical glass pots, having an opening at the bottom and containing sieved soil of average mixture, water was fed through the bottom until complete saturation was obtained; any excess of water was removed.

Subsequently, the cylindrical pots were surface treated with equivalents of 20 kg./ha. of dry active material. Care was taken to attain a uniform distribution. Immediately thereafter, 150 cc. of water were introduced in all pots from above and the bottom effluents were collected. The activity of the effluent and a number of soil samples, taken at the surface and at different depths of each pot, was tested according to the following method: 200 seeds of *Panicum crus-galli* are sown in a germination box in the presence of the effluent of one of the soil fractions of each pot; the number of the germinated seeds is determined each day and, finally, the biometric values of the grown seedlings are determined in all experimental germination boxes.

The results obtained at the end of the test are reported in Table 2; from these results it may be deduced that, while 2,4-DES, in the operating conditions, diffused to and was active even at a 6-cm. depth and, to some extent, at 8 cm., 2,4-dichlorophenoxyethanol remained localized in the first 2 cm. of the soil. The effluent was inactive in all cases.

From an examination of the foregoing results it may be seen that 2,4-dichlorophenoxyethanol (2,4-ETN) exerts its full activity even when the pots are kept at a relatively low temperature, while the activity of 2,4-DES is remarkably lowered under these conditions. In contrast thereto, no substantial difference was observed between the water samples withdrawn at the surface and the subsurface samples of water that had been in contact with soil.

EXAMPLE 4

This test was made to confirm what we had previously found, namely that 2,4-ETN, because of its biochemical characteristics, can exert an immediate and complete effect, while 2,4-DES, on the contrary, requires a conversion in the soil in order to become active.

200 seeds of *Panicum crus-galli* were sown onto the

*Table 2*

| Product | Germination substrate | germination, percent | epigeous part, cm. | hypogeous part, cm. | Percent of abnormal seedlings in respect of seedlings |
|---|---|---|---|---|---|
| 2,4-DES | Soil withdrawn from the pot at a depth of 2 cm | 54.5 | 2.092±0.07 | 0 | 100 |
| 2,4-DES | Soil withdrawn from the pot at a depth of 4 cm | 53 | 1.948±0.07 | 0 | 100 |
| 2,4-DES | Soil withdrawn from the pot at a depth of 6 cm | 69 | 7.315±0.22 | 0.565±0.06 | 98.55 |
| 2,4-DES | do | 46 | 8.456±0.26 | 4.543±0.24 | 7.61 |
| 2,4-ETN | Soil withdrawn from the pot at a depth of 2 cm | 45.5 | 1.593±0.07 | 0 | 100 |
| 2,4-ETN | Soil withdrawn from the pot at a depth of 4 cm | 60 | 9.012±0.21 | 6.029±0.23 | 0 |
| 2,4-ETN | Soil withdrawn from the pot at a depth of 6 cm | 55 | 7.968±0.25 | 6.063±0.28 | 1.82 |
| 2,4-ETN | Soil withdrawn from the pot at a depth of 8 cm | 56.5 | 8.460±0.24 | 5.168±0.22 | 1.77 |
| Control | Soil withdrawn from the pot at a depth of 2 cm | 55 | 7.082±0.26 | 4.859±0.30 | 0 |
| Control | Soil withdrawn from the pot at a depth of 4 cm | 56.5 | 8.062±0.24 | 5.230±0.26 | 0 |
| Control | Soil withdrawn from the pot at a depth of 6 cm | 53.5 | 8.416±0.28 | 4.705±0.22 | 0 |
| Control | Soil withdrawn from the pot at a depth of 8 cm | 51.5 | 8.898±0.27 | 4.466±0.22 | 0 |
| 2,4-DES | Filter paper impregnated with effluent | 61.5 | 7.345±0.23 | 4.845±0.18 | 0 |
| 2,4-ETN | do | 57.5 | 7.530±0.20 | 4.265±0.18 | 0 |
| Control | do | 62.5 | 7.872±0.18 | 3.344±0.15 | 0 |

EXAMPLE 3

In a test carried out in a conditioned room, the residual weedkiller activity of the steeping water of pots containing rice field soil previously treated with 2,4-DES and with 2,4-ETN in form of a granular composition, was compared as a function of the incubation temperature and of the period of time elapsing between the treatment and the test. The glass pots containing rice field soil were surface treated with the equivalent of 8 kg./ha. and the soil was then immediately submerged under 5 cm. of water. One half of the pots were incubated at 19–20° C. and the other at 10–15° C. 10 days after the treatment, samples of the steeping water of each pot were withdrawn (at the higher level and in contact with the soil) and contacted with *Panicum crus-galli* seeds placed in a germination box.

The results are reported in the following table:

*Table 3*

TESTS CARRIED OUT 10 DAYS AFTER THE TREATMENT

[(a) Pots incubated at 10–15° C.]

|  | Epigeous part (cm.) | hypogeous part (cm.) | Percent of abnormal seedlings |
|---|---|---|---|
| Control: |  |  |  |
| surface H₂O | 3.30 | 5.45 | 0 |
| subsurface H₂O | 2.97 | 5.18 | 0 |
| 2,4-DES: |  |  |  |
| surface H₂O | 2.60 | 3.94 | 35.13 |
| subsurface H₂O | 2.60 | 3.38 | 36.80 |
| 2,4-ETN: |  |  |  |
| surface H₂O | 2.04 | 0.64 | 91.42 |
| subsurface H₂O | 1.89 | 1.09 | 78.78 |

[(b) Pots incubated at 19–24° C.]

|  | | | |
|---|---|---|---|
| Control: |  |  |  |
| surface H₂O | 3.29 | 5.20 | 0 |
| subsurface H₂O | 3.22 | 4.88 | 0 |
| 2,4-DES: |  |  |  |
| surface H₂O | 2.38 | 0 | 100 |
| subsurface H₂O | 3.18 | 0 | 100 |
| 2,4-ETN: |  |  |  |
| surface H₂O | 3.48 | 0 | 100 |
| subsurface H₂O | 3.08 | 0 | 100 | surface of sieved soil, contained in a series of pots. Water was then added to submerge the soil under 5 cm. water.

The treatments were carried out when the seedlings reached the height of 1, 3 and 10 cm., respectively. The weedkilling compounds were applied in granular form in amounts corresponding to 0, 2 and 4 kg./ha. of active compound; the biometric values were determined 13 days after the treatment for the series of 1 cm. seedlings, 14 days after the treatment for the series of 3 cm. seedlings and after 18 days for the series of 10 cm. seedlings.

The results obtained at the end of the test are reported in the Table 4.

*Table 4*

| Product used | Dosage, kg./ha. | Height of the seedlings, cm. | Length of epigeous part, cm. | Length of hypogeous part, cm. | Abnormal seedlings in comparison with germinated seeds |
|---|---|---|---|---|---|
| Control |  | 1 | 8.357 | 4.528 | 6.52 |
| 2,4-DES | 1 | 1 | 6.757 | 1.190 | 73.03 |
| 2,4-ETN | 1 | 1 | 3.915 | 0.620 | 96.27 |
| 2,4-DES | 2 | 1 | 5.065 | 0.508 | 93.75 |
| 2,4-ETN | 2 | 1 | 3.570 | 0.332 | 100.00 |
| 2,4-DES | 1 | 3 | 12.408 | 2.432 | 16.88 |
| 2,4-ETN | 1 | 3 | 6.969 | 1.700 | 77.05 |
| 2,4-DES | 2 | 3 | 10.065 | 1.865 | 49.70 |
| 2,4-ETN | 2 | 3 | 6.361 | 1.809 | 83.06 |
| 2,4-DES | 1 | 10 | 14.323 | 2.930 | 39.47 |
| 2,4-ETN | 1 | 10 | 11.502 | 2.510 | 65.75 |
| 2,4-DES | 2 | 10 | 13.271 | 2.373 | 60.13 |
| 2,4-ETN | 2 | 10 | 8.420 | 1.947 | 89.68 |

From these results the following conclusions can be derived:

First: 2,4-ETN exerts in all cases a greater and faster effect than 2,4-DES. The greatest difference was found in case of the 3-cm. seedlings, treated with the lesser amounts.

Second: In case of the 10-cm. seedlings, 2,4-ETN applied in the larger amount, damaged the vitality of almost all seedlings while under the same conditions the action of 2,4-DES was more limited.

EXAMPLE 5

In a test carried out in a conditioned room, reproducing the daily average variations of temperature which occur in the rice field shortly before sowing, the action persistency of 2,4-DES and 2,4-ETN in the steeping water of treated soil was determined. In a series of glass pots containing sieved soil, the soil was submerged under 10 cm. water. Immediately thereafter, the treatment was carried out with both products, which were applied in form of a granular composition containing a fertilizer, in amounts corresponding to 4 kg./ha. All pots were incubated at +8° C. (lowest nightly temperature) and at +20° C. (highest day temperature). 5 days after this treatment, the steeping water was removed and replaced with the same quantity of fresh water of 20° C.

The activity of the first steeping water, before the substitution, and of the second steeping water, withdrawn from 19 to 27 days after the treatment, was tested on *Panicum crus-galli* seeds in a germination box.

The results of these germination tests are reported in Table 5.

At the end of the test, the rice and *Panicum crus-galli* plants were recovered and their biometric values determined. These values are reported in the following table:

Table 6

| | Biometric data determined on on rice 38 days after sowing | | | Biometric data determined on *Panicum crus-galli* 44 days after the treatment | | |
|---|---|---|---|---|---|---|
| | epigeous part, cm. | hypogeous part, cm. | Percent of abnormal seedlings | epigeous part, cm. | hypogeous part, cm. | Percent of abnormal seedlings |
| 2,4-DES | 8.624 | 1.066 | 0 | 6.703 | 1.033 | 94.80 |
| 2,4-ETN | 10.289 | 1.473 | 0 | 4.160 | 0.576 | 100N |
| control | 10.895 | 2.140 | 0 | 13.514 | 3.960 | 0 |

From these experiments it is evident that 2,4-ETN has a more intensive action than 2,4-DES on *Panicum crus-galli* and does not exert any dangerous influence on rice, while 2,4-DES depresses the growth of rice plants to a substantial degree.

Table 5

| | Sample of first steeping water withdrawn 1 h. before replacement | | | Sample of final steeping water withdrawn— | | | | | |
|---|---|---|---|---|---|---|---|---|---|
| | | | | 19 days after the treatment | | | 27 days after the treatment | | |
| | epigeous part (cm.) | hypogeous part (cm.) | Percent abnormal seedlings | epigeous part (cm.) | hypogeous part (cm.) | Percent abnormal seedlings | epigeous part (cm.) | hypogeous part (cm.) | Percent abnormal seedlings |
| 2,4-DES | 4.220 | 1.504 | 94.15 | 3.973 | 0.556 | 0 | 3.157 | 1.472 | 14.70 |
| 2,4-ETN | 3.758 | 0.565 | 100 | 3.563 | 1.310 | 0 | 3.006 | 1.542 | 4.10 |
| control | 3.189 | 3.155 | 0 | 3.457 | 1.374 | 0 | 2.656 | 1.423 | 2.36 |

The foregoing results permit the conclusion that, upon replacing the steeping water, 2,4-ETN is removed at a larger extent than 2,4-DES.

EXAMPLE 6

In this test the weed killing activity and the action persistency of 2,4-DES and of 2,4-ETN have been evaluated at conditions similar to these occurring during the sowing of rice fields.

Into a series of pots containing sieved soil, water was introduced up to a height of about 12 cm. 200 seeds of *Panicum crus-galli* were sown in each pot. When the seedlings reached an average height of 3 cm., they were treated with the two weed killing compounds in a granular formulation with a fertilizer, using amounts corresponding to 4 kg./ha. of active product. 6 days after the treatment, the steeping water was removed and substituted with water at 20° C. 50 seeds of rice were immediately sown in each pot.

During the experiment the incubation temperature was raised from 8° C. to 14° C. (lowest night temperature) and from 20° to 24° C. (highest day temperature).

We claim:

1. In the art of submerged aqueous rice field culture, the improvement comprising suppressing the growth of the weed *Panicum crus-galli* by distributing 2,4-dichlorophenoxyethanol over the field in granular form, the said ethanol remaining concentrated within the top layers of the submerged soil which contains the seeds of said weed that germinate during the season, the amount of said ethanol distributed being from 4 to below 10 kilograms per hectare of land surface, the field being subsequently subjected to lavement with water and to sowing of the rice seed.

2. In the art of submerged aqueous rice field culture, the improvement comprising suppressing the growth of the weed *Panicum crus-galli* by distributing 2,4-dichlorophenoxyethanol over the field in granular form, the said ethanol remaining concentrated within the top layers of the submerged soil which contains the seeds of said weed that germinate during the season, the amount of said ethanol distributed being from 4 to 5 kilograms per hectare of land surface, the field being subsequently subjected to lavement with water and to sowing of the rice seed.

3. In the art of submerged aqueous rice field culture, the improvement comprising suppressing the growth of weeds by distributing 2,4-dichlorophenoxyethanol over the field in granular form, the said ethanol being concentrated within the top layers of the submerged soil which contains the weed seeds, the amount of said ethanol distributed being from 4 to 5 kilograms per hectare of land surface, the field being subsequently subjected to lavement with water and to sowing of the rice seed.

(References on following page)

References Cited in the file of this patent

UNITED STATES PATENTS

| | | |
|---|---|---|
| 2,656,265 | Mullison | Oct. 20, 1953 |
| 2,709,648 | Ryker et al. | May 31, 1955 |
| 2,712,990 | Swezey | July 12, 1955 |
| 2,714,063 | Swezey | July 26, 1955 |
| 2,765,224 | Lambrech | Oct. 2, 1956 |

FOREIGN PATENTS

| | | |
|---|---|---|
| 574,995 | Great Britain | Jan. 30, 1946 |

OTHER REFERENCES

Ahlgren et al.: "Principles of Weed Control," publ. by J. Wiley and Sons, New York, 1951, page 137.

Vlitos et al.: In "Nature," No. 4351, Mar. 21, 1953, page 523.